United States Patent Office

3,362,847
Patented Jan. 9, 1968

3,362,847
WATER-DISPERSIBILITY OF CELLULOSE ETHERS BY SURFACE TREATMENT WITH POLYBASIC ACIDS AND POLYAMINES
Marion C. Day, Jr., Baton Rouge, La., assignor to The Dow Chemical Company, Midland, Mich., a corporation of Delaware
No Drawing. Filed May 18, 1964, Ser. No. 368,412
11 Claims. (Cl. 117—100)

ABSTRACT OF THE DISCLOSURE

The water-dispersibility of water-soluble cellulose ethers is improved by treating the surface of the particulate ether with from about 0.2 up to about 12 percent by weight, based on the weight of the ether, of a combination of a water-soluble, polybasic organic carboxylic acid having from 2 to 10 carbons and a water-soluble organic polyamine having at least two primary amino groups. The polybasic acid and amine are applied to the ether from an inert solvent for the treating agent, which is also a non-solvent for the ether. At temperatures above the thermogelling temperature of a thermogelling ether, water can be used as the solvent for the treating reagents.

---

The present invention relates generally to a novel cellulose ether composition having improved solution properties. More particularly, the invention concerns the surface treatment of non-ionic, water-soluble cellulose ethers to improve the water dispersibility and ultimately the dissolution of such materials in water.

The difficulties involved with dissolving water-soluble cellulose ethers in water are well known to the art. Recent patents issued to Menkart et al., United States Patent 3,072,635, and Jullander, United States Patent 2,879,268, describe surface treatments for particulate cellulose ethers to effect an improvement in their water dispersibility. That is, the treated ethers uniformly disperse in water without forming gelatinous agglomerates, which discontinuities in the dispersion, or fish eyes as they are sometimes called, cause serious problems in the utilization of the ethers.

It would be desirable, and it is an object of the present invention, to provide a novel method for effecting surface treatment of cellulose ethers. Another object is to provide a cellulose ether composition having improved water dispersibility as well as good water solution properties.

Accordingly, the present invention provides a process for treating an alkyl or hydroxyalkyl, water-soluble cellulose ether which comprises uniformly coating said cellulose ether in particulate form with from about 0.1 percent to about 6 percent by weight of a water-soluble, polybasic organic acid having up to 10 carbon atoms and from about 0.1 percent to about 6 percent by weight of a water-soluble, organic amine having at least 2 primary amino groups, said percentages being based on the weight of the ether treated. As used herein, "water-soluble" means uniformly dispersible in water to form a visually homogeneous solution to an extent of at least about 0.1 percent by weight, based on the weight of water.

When treated in accordance with the process described above, the ether particles are readily dispersed in water with little or no formation of difficultly soluble fish eyes. Moreover, once dispersed in water the cellulose ethers quickly achieve a true solution as evidenced by the attainment of a solution viscosity essentially constant with time.

While the invention in no way depends upon an explanation of the mechanism whereby improved dispersion and dissolution of the ethers in water is achieved, it is believed to be similar to the mechanism operating in the aforementioned patents. Particularly it is believed the specified treatment imparts an initially water-insoluble character to the surface of the cellulose ether. This then promotes uniform dispersion and wetting of the polymer particles. Thereafter water penetrates the individual particles and dissolution occurs. The fact that the ethers do completely dissolve militates against any significant amount of ester formation between the polybasic acid and available hydroxyls on the cellulose. Rather, the performance of the ethers so treated in water evidences bond energies of secondary strength.

A unique feature of the present invention is the requirement that the water-soluble amine treating agent have at least two primary amino groups. Some preferred examples of the amines include ethylenediamine, diethylenetriamine, triethylenetetraamine, tetraethylenepentaamine, hexamethylenediamine, 1,3-propylenediamine, phenylenediamine and the like aliphatic and aromatic poly, primary amines. The preferred organic amines are those having a molecular weight not exceeding 200 and consisting of carbon, hydrogen and nitrogen.

The polybasic acids utilized in the invention can be characterized as water-soluble, organic compounds consisting essentially of carbon, hydrogen and oxygen and having from 2 up to 10 carbons. Preferred acids are the water-soluble dibasic organic carboxylic acids, but tribasic and higher acids can also be used if desired. Illustrative of the useful acids are oxalic, citric, malonic, succinic, adipic, pimelic, glutaconic, glutaric, itaconic, fumaric, maleic, tartaric, ethylenediamine tetraacetic and the like aliphatic polycarboxylic acids. Illustrative of useful aromatic polybasic carboxylic acids are trimellitic, pyromellitic, mellitic and phthalic acids.

The surface treatment of the invention can be applied to any water-soluble, non-ionic cellulose ether. A great number of such cellulose ethers are commercially available and a greater number have been taught throughout the extensive development of the art. Among the known water-soluble cellulose ethers are methyl cellulose, hydroxyethyl cellulose and hydroxypropyl cellulose. In addition to the foregoing simple cellulose ethers, the invention is also applicable to the mixed cellulose ethers such as methyl ethyl cellulose, methyl hydroxyethyl cellulose, methyl hydroxypropyl cellulose and methyl hydroxybutyl cellulose and the like cellulose ethers. In general the ethers intended are the alkyl, hydroxyalkyl and mixed alkyl hydroxyalkyl, water-soluble derivatives of cellulose wherein the alkyl group contains from 1 to 4 carbons.

To carry out the invention, the cellulose ether is dispersed as a particulate solid in an inert organic liquid which does not dissolve the ether. Likewise, one or more of the aforementioned polybasic carboxylic acids and one or more of the poly primary amines are incorporated into the organic liquid which is a solvent for these treating agents. Organic liquids suitably inert for use as the reaction medium include, for example, methanol-water mixtures, methyl ethyl ketone, acetone, and in some instances, hot water. When at a high enough temperature, water is a non-solvent for thermally gelling water-soluble alkyl ethers. Thus it can be employed at elevated temperatures above the thermogelling temperature for the ether being treated as a dispersing medium for the cellulose ether and as an applicating solvent for the acid and amine treating agents.

The amounts of the treating agents incorporated into the organic liquid will be sufficient to provide a treated ether having a coating of the treating agents within the aforementioned overall limits. The actual amount required to achieve the desired treatment will vary, as will be apparent to those skilled in the art, according to the method used to separate the ether from the liquid, by the amount of liquid retained on the surface of the ether particles, their particle size and the like considerations.

Generally it is preferred to employ the acid and amine treating agents in an approximately 1:1 ratio on a molar basis. This ratio can be varied, however, to within the range from about 4:1 to about 1:4 to achieve some beneficial effect in accordance with the invention. The weight of the combined treating agents in the surface coating, i.e., carboxylic acid plus amine, can vary from as little as about 0.2 percent up to as much as 12 percent by weight of the cellulose ether. Preferably the amount is within the contained no lumps or difficultly soluble cellulose ether aggregates.

In further runs conducted in a manner like the procedure described above, samples of the same cellulose ether were given surface treatments according to the schedule set forth in the following table. The results of these operations in terms of the water dispersibility and general solution properties of the treated ether are qualitatively indicated in the column headed "Results." For the purposes of comparison, runs were made utilizing none and individual components of the treating agent combination necessary to the invention.

TABLE

| Example No. | Cellulose Ether, gm. | Polybasic Acid | Polyamine | Results |
| --- | --- | --- | --- | --- |
| 2 | 13.5 | None | None | Failure, extensive lumping. |
| 3 | 13.5 | 0.5 gm. oxalic acid | do | Do. |
| 4 | 13.5 | None | 0.5 gm. DETA [1] | Do. |
| 5 | 13.5 | 0.5 gm. oxalic acid | 0.5 gm. DETA | Very good dispersion, clear final solution. |
| 6 | 13.5 | 0.90 gm. citric acid | 0.5 gm. DETA | Do. |
| 7 | 13.5 | 0.3 gm. oxalic acid | 0.3 gm. DETA | Do. |
| 8 | 13.5 | 0.1 gm. oxalic acid | 0.3 gm. DETA | Fair dispersion, some lumps but better than controls Nos. 2, 3, 4. |

[1] DETA is diethylene triamine.

range from about 0.5 up to 2.5 percent by weight of the ether.

Once the solution of the treating agents and cellulose ether solids to be treated have been brought into mutual contact, the ether is recovered from the solvent by filtration or the solvent removed from the solids by evaporation. In either event the ether is dried to substantially eliminate solvent remaining on the surface of the ether particles thereby forming a desired uniform surface coating of the polybasic acid and organic poly primary amine. One advantage of the present invention is that such drying to effect an efficient surface treatment of the ether may take place at room temperatures or moderate elevated temperatures, e.g., up to 90° C. After drying, the surface treated cellulose ethers are readily dispersed and ultimaetly dissolved in water.

A preferred method for carrying out the invention involves spraying the polybasic acid and poly primary amine treating agents, usually in mutual solution in an inert liquid solvent therefor, onto a mass of continuously agitated cellulose ether particles. The spraying is continued until the amount of the treating agent combination has been incorporated into the ether to achieve a desired surface coating. Thereafter, the sprayed ether is dried, preferably at a moderate temperature such as room temperature, and packaged for shipment.

The following examples are set forth to illustrate the present invention in light of present understanding about the invention, but the conditions used in, and the manner of carrying out, these examples should in no way be construed as limitations on the invention other than as delineated in the appended claims.

*Examples 1–8*

A water-soluble, granular hydroxypropylmethyl cellulose ether containing approximately 28 percent by weight methoxy groups and about 6 percent by weight propoxy groups was slurried in sufficient acetone to render the resulting solids-liquid admixture fluid. In this admixture, which contained 13.5 grams of the cellulose ether, was dissolved 0.125 gram of oxalic acid and 8 drops (approximately 0.12 gram) of ethylenediamine. After thorough mixing the slurry was then allowed to dry at room temperature.

To evaluate the water solubility of the surface treated product so prepared, the entire amount of the dry product was added to 300 milliliters of water, and after standing for one minute, mildly agitated by stirring. A viscous water solution of the cellulose ether was obtained which In other tests like that described above, polyamines such as triethylenetetraamine, hexamethylenediamine, phenylenediamine, have been substituted for the diethylenetriamine utilized above to achieve comparable results. Similarly other organic polybasic carboxylic acids such as malonic, tartaric, pimelic, citric, and ethylenediamine tetraacetic acids are substituted for oxalic acid to achieve good results as regards improved cellulose ether water dispersibility and dissolution properties.

What is claimed is:

1. A process which comprises coating a non-ionic, water-soluble cellulose ether as a particulate solid with a water-soluble, polybasic, organic carboxylic acid consisting of only hydrogen, carbon and oxygen and having from 2 up to 10 carbons and a water-soluble, organic polyamine having at least two primary amino groups, said carboxylic acid and polyamine being employed in a molar ratio of about 1:4 to about 4:1 and the combined amount of the carboxylic acid and amine being within the range from about 0.2 to about 12 percent by weight of the particulate cellulose ether, said coating of the ether being effected by contacting the cellulose ether with a solution of the carboxylic acid and polyamine treating agents in an inert solvent for the treating agents, but which is a non-solvent for the ether, and thereafter recovering the solid ether particles and drying them.

2. A process as in claim 1 wherein the coating of the cellulose ether is effected by spraying the ether with a liquid solution of the carboxylic acid and polyamine treating agents.

3. A process as in claim 1 wherein the carboxylic acid is oxalic acid and the polyamine is diethylenetriamine.

4. A process as in claim 1 wherein the carboxylic acid is citric acid and the polyamine is diethylenetriamine.

5. A process as in claim 1 wherein the cellulose ether treated is a water-soluble methyl cellulose ether.

6. A process as in claim 1 wherein the cellulose ether treated is a water-soluble mixed methyl hydroxypropyl cellulose ether.

7. A process which comprises coating a non-ionic, water-soluble and thermogelling cellulose ether in the form of a finely divided solid by spraying the particulate ether uniformly with an aqueous solution of a water-soluble, polybasic, organic carboxylic acid consisting of only hydrogen, carbon and oxygen and having from 2 to 10 carbons and a water-soluble, organic polyamine having at least two primary amino groups, said carboxylic acid and polyamine being present in the aqueous solution in a molar ratio of about 1:4 to about 4:1, respectively, and the combined amount of the acid and amine sprayed on the ether being within the range from about 0.2 to about 12 percent by weight of the finely divided cellulose ether, and said aqueous solution being sprayed on the ether being at a temperature above the thermogelling temperature of the cellulose ether treated.

8. A particulate nonionic, water-soluble cellulose ether bearing a surface coating of a water-soluble polybasic, organic carboxylic acid consisting of only hydrogen, carbon and oxygen and having from 2 up to 10 carbons and a water-soluble, organic polyamine having at least two primary amino groups, said carboxylic acid and polyamine being present in the coating in a molar ratio 1:4 to about 4:1 and the combined amount of the carboxylic acid and amine forming the coating being within the range from about 0.2 to about 12 percent weight of the particulate cellulose ether.

9. A composition as in claim 8 wherein the carboxylic acid is oxalic acid and the polyethylene is diethylenetriamine.

10. A composition as in claim 8 wherein the acid is citric acid and the polyamine is diethylenetriamine.

11. A composition as in claim 8 wherein the cellulose ether having the described coating is a water-soluble methyl cellulose ether.

References Cited

UNITED STATES PATENTS

| | | | |
|---|---|---|---|
| 2,270,200 | 9/1940 | Upright | 260—232 X |
| 2,445,226 | 3/1946 | Landers | 117—100 |
| 2,879,268 | 3/1959 | Jullander | 260—232 |
| 3,072,635 | 1/1963 | Menkart et al. | 260—232 |
| 3,077,468 | 2/1963 | Geurden | 260—232 |

MURRAY KATZ, *Primary Examiner.*

WILLIAM D. MARTIN, *Examiner.*

EDWARD J. CABIC, *Assistant Examiner.*